United States Patent
Le et al.

(10) Patent No.: US 8,847,427 B2
(45) Date of Patent: Sep. 30, 2014

(54) PREDICTION OF TRANSISTOR TEMPERATURE IN AN INVERTER POWER MODULE OF A VEHICLE, AND RELATED OPERATING METHODS

(75) Inventors: Khiet Le, Mission Viejo, CA (US); Gregory D. Rosdahl, Dominguez Hills, CA (US); David Tang, Rancho Cucamonga, CA (US); Seok-Joo Jang, Irvine, CA (US); Song He, Irvine, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 563 days.

(21) Appl. No.: 13/221,667

(22) Filed: Aug. 30, 2011

(65) Prior Publication Data

US 2013/0049454 A1 Feb. 28, 2013

(51) Int. Cl.
*B60L 1/00* (2006.01)
(52) U.S. Cl.
USPC .......................................................... 307/9.1
(58) Field of Classification Search
USPC .......................................................... 307/9.1
See application file for complete search history.

(56) References Cited

U.S. PATENT DOCUMENTS

| | | |
|---|---|---|
| 2007/0158776 A1 | 7/2007 | Julio et al. |
| 2009/0012739 A1 | 1/2009 | Flett |
| 2009/0052210 A1* | 2/2009 | Ward et al. ................. 363/56.01 |

FOREIGN PATENT DOCUMENTS

| | | |
|---|---|---|
| CN | 2221267 Y | 2/1996 |
| CN | 1472877 A | 2/2004 |
| CN | 1664522 A | 9/2005 |
| CN | 101397011 A | 4/2009 |
| CN | 101997302 A | 3/2011 |
| JP | 2002107236 A | 4/2002 |

OTHER PUBLICATIONS

State Intellectual Property Office of the Peoples' Republic of China, Office Action for Chinese Patent Application No. 201210314418.0, mailed Jul. 10, 2014.

\* cited by examiner

*Primary Examiner* — Robert L. Deberadinis
(74) *Attorney, Agent, or Firm* — Ingrassia Fisher & Lorenz, P.C.

(57) ABSTRACT

A power module system for a vehicle includes a circuit board, a power transistor mounted to the circuit board, and a temperature sensor mounted to the circuit board in a sensing location remote from the power transistor. The temperature sensor is configured to measure a real-time temperature at the sensing location. The system also includes a processor coupled to the temperature sensor to generate a predicted real-time silicon temperature for the power transistor from the measured real-time temperature at the sensing location. The predicted real-time silicon temperature is generated using a selected calibration curve that corresponds to a current operating state of the vehicle.

20 Claims, 5 Drawing Sheets

PREDICTION OF TRANSISTOR TEMPERATURE IN AN INVERTER POWER MODULE OF A VEHICLE, AND RELATED OPERATING METHODS

TECHNICAL FIELD

Embodiments of the subject matter described herein relate generally to temperature measurement. More particularly, embodiments of the subject matter relate to the prediction of the real-time silicon temperature of a power transistor in an inverter module of a vehicle.

BACKGROUND

In recent years, advances in technology, as well as ever evolving tastes in style, have led to substantial changes in the design of automobiles. One of the changes involves the power usage and complexity of the various electrical systems within automobiles, particularly alternative fuel vehicles, such as hybrid, electric, and fuel cell vehicles.

Many of the electrical components, including the electric traction motors used in electric and hybrid electric vehicles, receive electrical power from alternating current (AC) power supplies. However, the power sources (e.g., batteries) used in such applications provide only direct current (DC) power. Thus, devices known as power inverters are used to convert the DC power to AC power. Such power inverters are implemented using a plurality of power transistors that exhibit temperature cycling during normal use. Accordingly, a power inverter module of a vehicle may include some type of thermal protection circuit to monitor the temperature of the module.

Some conventional power modules use a temperature sensor such as a thermistor to obtain a rough estimate of the temperature of one or more transistors in the inverter module. The temperature sensor does not directly or precisely measure the actual real-time silicon temperature of the transistor(s) because the temperature sensor is not co-located with the transistor(s).

BRIEF SUMMARY

A method of operating a power inverter module of a vehicle is provided. The method obtains a temperature reading at a location of the power inverter module that is remote from the power transistor, and determines a current operating state of the vehicle. The method continues by adjusting the temperature reading in accordance with a selected calibration curve corresponding to the current operating state of the vehicle, resulting in a predicted real-time silicon temperature for a transistor of the power inverter module. The method continues by operating the power inverter module in a manner that is influenced by the predicted real-time silicon temperature.

Another method of operating a power inverter module of a vehicle is also provided. The power inverter module includes a power transistor and a thermistor mounted at a location that is remote from the power transistor. The method obtains a temperature reading using the thermistor, determines a current operating state of the vehicle, and selects a calibration curve from a plurality of different temperature calibration curves. The selected calibration curve corresponds to the current operating state of the vehicle. The method continues by adjusting the temperature reading with the selected calibration curve to obtain a predicted real-time temperature of the power transistor, and by operating the power inverter module in accordance with the predicted real-time temperature of the power transistor.

Also provided is a power module system for a vehicle. The power module system includes a circuit board, a power transistor mounted to the circuit board, and a temperature sensor mounted to the circuit board in a sensing location remote from the power transistor. The temperature sensor is configured to measure a real-time temperature at the sensing location. The system also includes a processor coupled to the temperature sensor to generate a predicted real-time silicon temperature for the power transistor from the measured real-time temperature at the sensing location. The predicted real-time silicon temperature is generated using a selected calibration curve that corresponds to a current operating state of the vehicle.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The technology described here can be used to predict the junction temperature of one or more transistors used in a power module of an electric or hybrid vehicle. A real-time temperature measurement is taken at a particular location of the power module, using a sensor such as a thermistor. The measured temperature data is then calibrated using calibration data obtained from infrared sensor data correlated to thermistor data under various vehicle operating conditions. For example, a second order transfer function can be used to predict the real-time junction temperature based on the real-time data obtained from the thermistor.

This approach enables an accurate prediction of junction temperature during vehicle operation, across a wide range of operating conditions. Moreover, the actual transistor temperature can be used in connection with a precise thermal protection system for the power inverter. Knowledge of the actual transistor temperature also allows the vehicle to operate the power inverter in a more efficient and effective manner due to better thermal protection.

Figure 1:
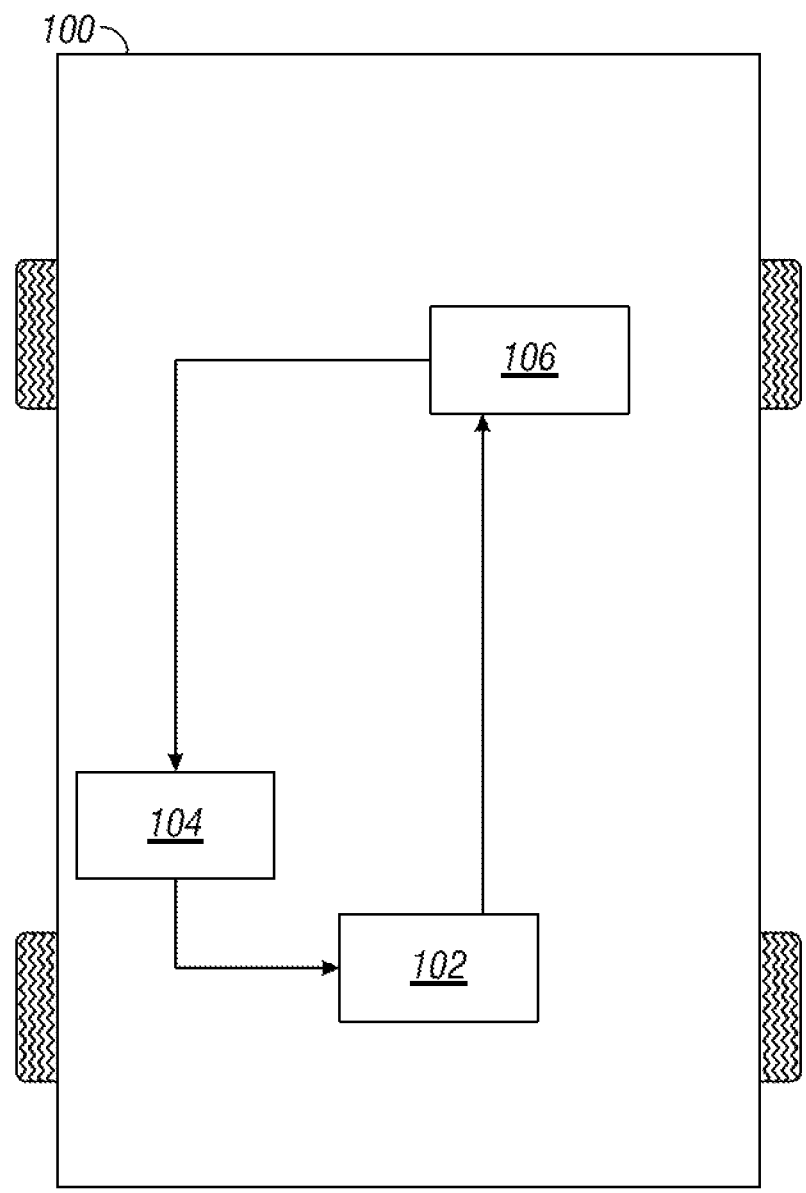
FIG. 1 is a simplified schematic representation of a vehicle having an electric traction system.

The subject matter described here can be utilized with a power inverter module for an electric motor of the type found in vehicles. Various embodiments relate to methods of operating a power inverter module of a vehicle, thermal protection methodologies for a power inverter module, a power module system for a vehicle, and the like. For example, the subject matter presented here can be used with an electric traction motor of an electric or hybrid automobile. In this regard, FIG. 1 is a simplified schematic representation of a vehicle 100 having an electric traction system. An embodiment of the electric traction system includes, without limitation: an electric motor 102; a power inverter module 104; and a motor controller 106. The components depicted in FIG. 1 cooperate in a well known manner to control and regulate the electric motor 102 for purposes of providing torque to the traction wheels of the vehicle. The motor controller 106 controls the operation of the power inverter module 104, which converts energy from one or more direct current energy sources (not shown) into alternating current energy for driving the electric motor 102.

Figure 2:
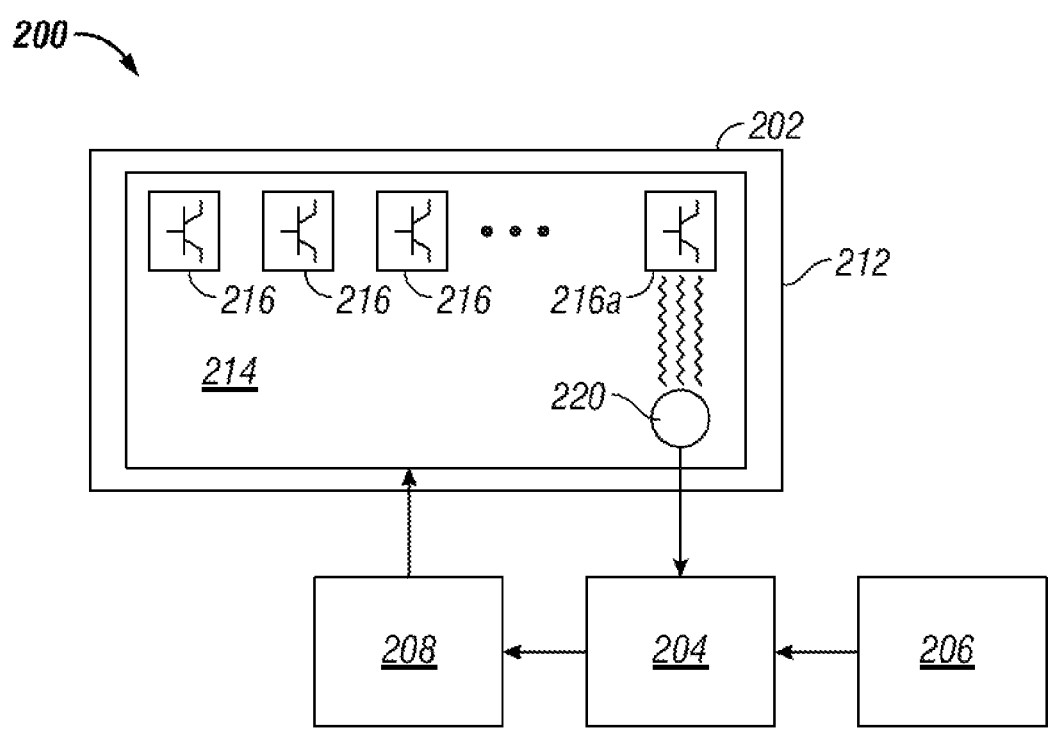
FIG. 2 is a simplified schematic representation of an exemplary embodiment of a power module system for a vehicle.

In certain embodiments, a power inverter module of a vehicle is subjected to a thermal protection scheme or methodology that monitors the temperature of the power inverter module for diagnostic, safety, maintenance, and/or other purposes. In this regard, FIG. 2 is a simplified schematic representation of an exemplary embodiment of a power module system 200 for a vehicle. The power module system 200 may, for example, be implemented in the vehicle 100 shown in FIG. 1, and the power module system 200 may include or cooperate with some or all of the components depicted in FIG. 1. The illustrated embodiment of the power module system 200 generally includes, without limitation: a power inverter module 202; a processor 204; a memory element 206; and a motor controller. Although these elements are depicted as distinct blocks, an implementation of the power module system 200 may be configured such that some or all of the illustrated blocks are integrated or co-located. For example, the processor 204, the memory element 206, and the motor controller 208 could be implemented together as an application-specific integrated circuit (ASIC). As another example, the functionality of the motor controller 208 and the processor 204 could be combined or integrated into one or more other electronic control units (ECUs) onboard the host vehicle.

The power inverter module 202 may be packaged in a housing 212, shell, or any appropriate physical structure. The housing 212 may be used to support and protect at least one circuit board 214 for the electronic (and other) components of the power inverter module 202. In certain embodiments, the power inverter module 202 includes a plurality of power transistors 216 and associated diodes (not shown) that are mounted to the circuit board 214 in an arrangement that accommodates the conversion of energy from a direct current (DC) energy source into alternating current (AC) energy suitable for driving an electric motor, as is well understood. In practice, the transistors 216 may be realized using any suitable semiconductor transistor technology, such as a insulated gate bipolar transistor (IGBT) formed on a silicon substrate, a field-effect transistor (e.g., a MOSFET or the like), or any other comparable device known in the art.

The power module system 200 includes at least one temperature sensor 220 mounted to the circuit board 214 in a sensing location that is remote from the transistors 216. Thus, the temperature sensor 220 measures the real-time temperature at its sensing location rather than the real-time temperature of the transistors 216 directly. In practice, the location of the temperature sensor 220 is chosen such that the physical distance between the temperature sensor 220 and a monitored transistor 216a is less than the distance between the temperature sensor 220 and all the other transistors 216. In a typical installation, the distance between the transistor 216a and the temperature sensor 220 is within the range of about 5 mm to about 10 mm. Notably, the difference between the temperature at the sensing location and the actual junction temperature of the transistor 216a can be significant, and is a function of power dissipation, current flow conditions, and physical distance. For example, in certain embodiments the nominal temperature difference may be as high as about 27 degrees Celsius. Moreover, the thermal lag time between the temperature sensor 220 and the transistor 216a is a function of spatial distance and mass of the temperature sensor 220.

The temperature sensor 220 may be utilized with a thermal protection scheme for the power module system 200. For this reason, the transistor that typically runs the hottest is chosen to be the monitored transistor 216a. Thus, the location of the hottest transistor 216a on the circuit board 214 influences and determines the sensing location of the temperature sensor 220. In alternate embodiments, the hottest transistor need not be monitored. Moreover, a plurality of temperature sensors 220 could be utilized to monitor more than one transistor 216 at a time.

In operation, a temperature dependent characteristic of the temperature sensor 220 is monitored or measured by the processor 204 to determine a real-time temperature reading for the sensing location. Although not always required, the exemplary embodiment presented here uses a thermistor for the temperature sensor 220. Thus, the temperature dependent characteristic of the thermistor is its electrical resistance. Accordingly, the power module system 200 may include a suitably configured circuit (which may be implemented using the processor 204) that measures the real-time resistance of the thermistor and converts the resistance measurement into a corresponding temperature measurement.

The processor 204 and the motor controller 208 are each configured to perform or support the various tasks, methods, and processes described herein. In practice, the processor 204 and the motor controller 208 may each be implemented or realized with a general purpose processor, a microprocessor, a microcontroller, a content addressable memory, a digital signal processor, an application specific integrated circuit, a field programmable gate array, any suitable programmable logic device, discrete gate or transistor logic, discrete hardware components, or any combination thereof, designed to support and/or perform the functions described herein. In this regard, the processor 204 may be coupled to the temperature sensor 220 to generate a predicted real-time silicon temperature for the power transistor 216a, based on the measured real-time temperature at the sensing location. The processor 204 and/or the motor controller 208 may also be configured to operate the power module system 200 in a specified manner in accordance with the predicted real-time silicon temperature of the transistor 216a.

As explained in more detail below, the temperature of the transistor 216a is accurately predicted using one or more temperature calibration curves that correlate the temperature measured at the sensing location to the actual junction temperature of the transistor 216a. More specifically, a plurality of temperature calibration curves are stored in the memory element 206, where each calibration curve corresponds to a respective operating state of the vehicle. The different calibration profiles represent typical operating scenarios that might place the power module system 200 under excessive thermal stress.

For various reasons, it would be desirable to have a precise determination of the actual real-time temperature of the transistor 216a rather than relying only on the measured temperature at the sensing location of the temperature sensor 220. For example, rough estimates of the junction temperature of the transistor 216a will not provide adequate thermal protection under high current or abrupt change in flow conditions.

Accordingly, the technique presented here employs a different methodology of approximating silicon temperature using calibration curves based on thermistor readings and direct infrared thermometer readings. With more accurate approximation of silicon temperature, the power module system 200 can further reduce margin bandwidth and operate the inverter in a more efficient and effective manner. In addition, the operating conditions of the inverter can be derated as the power module system 200 ages or as the performance of the power module system 200 degrades. The approach described here identifies a thermal system model using step responses, and predicts transient temperature change in silicon based on thermistor readings under arbitrary thermal loading conditions.

Figure 3:
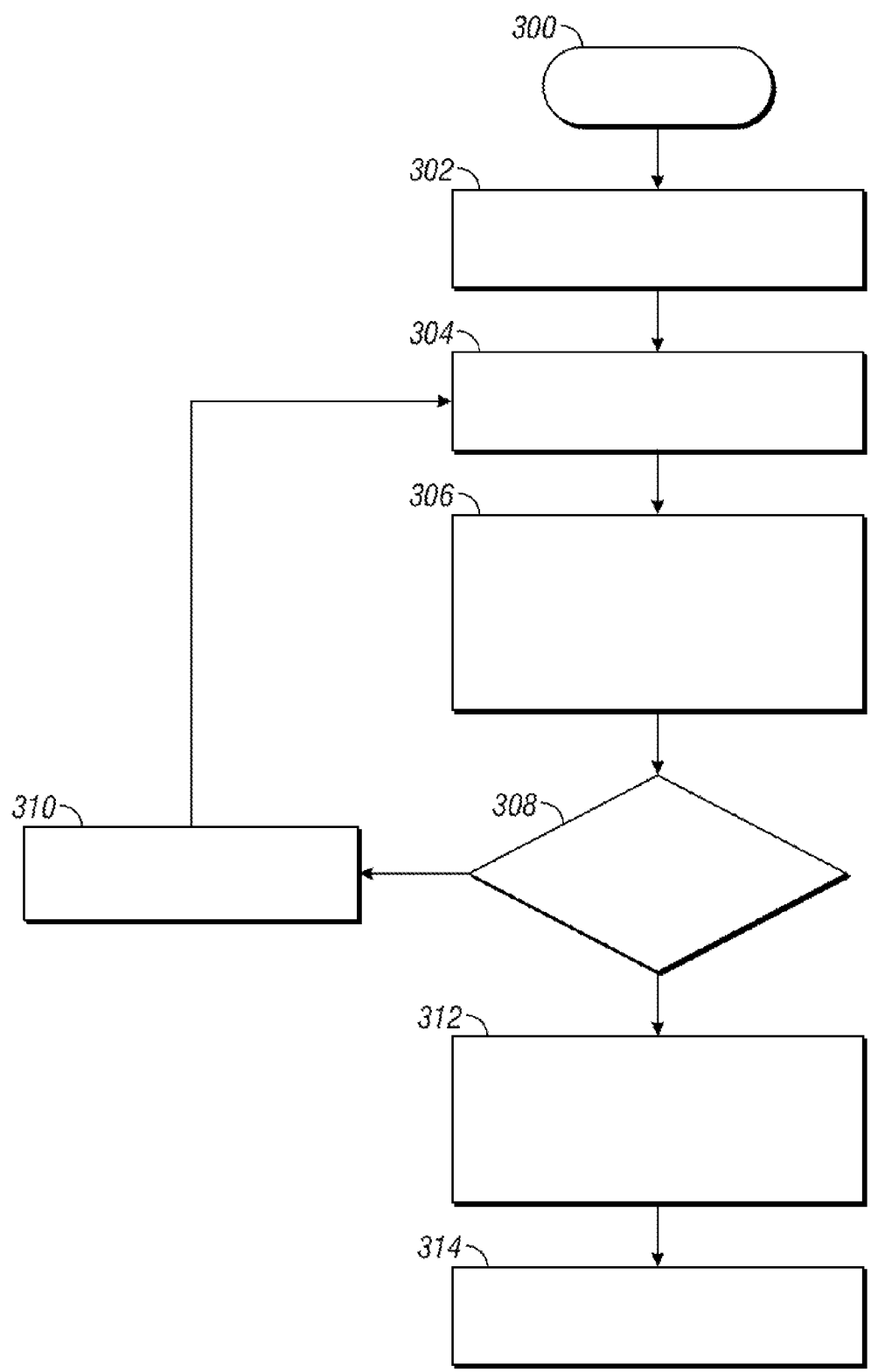
FIG. 3 is a flow chart that illustrates an exemplary embodiment of a temperature calibration process.

FIG. 3 is a flow chart that illustrates an exemplary embodiment of a temperature calibration process 300, which may be performed to generate one or more temperature calibration curves for a system such as the power module system 200. In practice, different calibration curves are obtained for different vehicle operating conditions (e.g., operating states that typically result in overheating of the transistors in the power inverter module). A calibrated operating state may be, without limitation, any of the following states: wide open throttle; launch from a stall; or hill climbing. The process 300 may begin by simulating the conditions corresponding to a first operating state (task 302). During task 302, the inverter module is subjected to control commands that emulate the commands that would be generated by the vehicle when actually operating in the first operating state. In practice, these commands may relate to various electromechanical parameters associated with the operation of the inverter, e.g., torque, current, impedance, or the like.

The power inverter module can then be operated under the conditions that emulate the first operating state. During this time, the process 300 varies the temperature of the system for purposes of calibration. For this particular embodiment, the process 300 applies pulsed thermal loading to the system (task 304) to obtain the associated thermal response of the thermistor and the transistor. As the system temperature is varied, the process 300 measures and collects the real-time thermistor temperature readings along with real-time transistor temperature readings using an appropriate instrument such as an infrared thermometer that interrogates the silicon junction of the target transistor (task 306). During task 306, therefore, the process 300 collects temperature readings (at both the sensing location of the thermistor and the target transistor) for a plurality of sampling points. The temperature data may be saved for analysis and processing as described below.

The process 300 collects temperature data in the manner described above for each of the different operating states to be calibrated. If data collection is done (query task 308), then the process 300 proceeds to a task 312. If not, then the process 300 leads to a task 310 to simulate the next operating state, and to operate the power inverter module in a way that emulates the conditions for the next operating state. Thereafter, temperature data collection proceeds as described above.

After all of the temperature data has been collected, the process 300 derives the temperature calibration curves for the different operating state conditions (task 312). Alternatively, each calibration curve could be derived after the associated temperature data has been collected, and without waiting for all of the temperature data to be gathered. Each temperature calibration curve serves to correlate the collected thermistor temperature readings to the directly measured temperature readings obtained from the infrared thermometer (i.e., the measured temperature data for the target transistor). The temperature calibration curves can then be stored and maintained in a memory element of the system (task 314) for use during operation of the vehicle. In practice, each calibration curve is linked to or is otherwise associated with its respective operating state, such that the best calibration curve can be accessed and utilized during operation of the vehicle.

In certain embodiments, calibration curves from the infrared temperature data and the thermistor data at various conditions will be implemented to calculate the silicon junction temperature of the target transistor. The pulsed thermal loading approach allows the system to obtain a step-up response of temperature versus time for the thermistor under a transient thermal condition, obtain a step-up response of temperature versus time for the power transistor (by way of the infrared thermometer) under the same transient thermal condition, and thereafter correlate the step-up responses. Alternatively or additionally, step-down responses of temperature versus time could be used to obtain the calibration curves.

Figure 4:
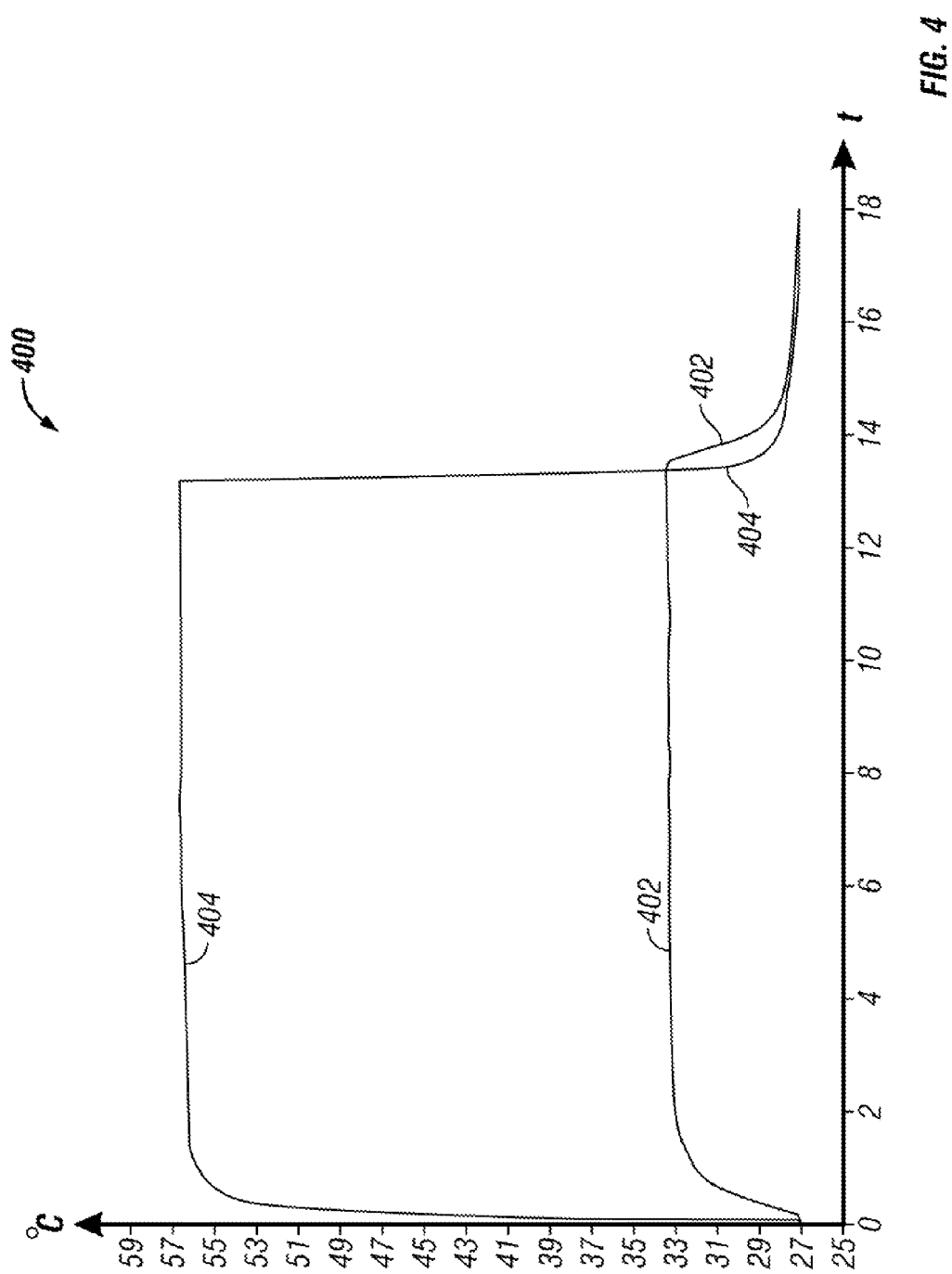
FIG. 4 is an exemplary graph that shows typical temperature readings for a thermistor and an infrared thermometer.

FIG. 4 is an exemplary graph 400 that shows typical temperature readings for a thermistor and an infrared thermometer subjected to a pulsed thermal loading condition. The graph 400 includes a thermistor plot 402 of temperature versus time, and an infrared thermometer plot 404 of temperature versus time, depicted on common axes. Notably, the step-up or rise time of the infrared thermometer is significantly shorter than the step-up or rise time of the thermistor. Likewise (although less drastic), the step-down or fall time of the infrared thermometer is shorter than the step-down or fall time of the thermistor.

There are two predominant time constants (short and long) associated with the plots 402, 404. In accordance with conventional nomenclature, the short time constant is defined as the time required to reach 63.2% of the temperature difference (between the starting temperature and the final nominal temperature). For the illustrated example, therefore, the short time constant for the infrared thermometer plot 404 is the time required to reach 63.2% of about 57 degrees Celsius, or about 120 ms. In contrast, the short time constant for the thermistor plot 402 is the time required to reach 63.2% of about 33 degrees Celsius, or about 600 ms. The long time constant is defined as the time required to reach 98.0% of about 56.5 degrees Celsius, in about ten seconds. For this example, the long time constant for the infrared thermometer plot 404 is about 0.5/29 degrees, or about 2.0%. In contrast, the long time constant for the thermistor plot 402 is about 0.5/6.0 degrees, or about 8.0%. Capturing these time constants by calibrating will provide a more accurate correlation of the output temperature to the input.

In practice, a second order transfer function can be used to predict the transistor junction temperature based on the real-time temperature data obtained from the thermistor. The calibrated measurement data can be processed in a way that considers the step-up or step-down response of thermistor temperature as the input and the step-up or step-down response of infrared temperature as the output. For this example, a linear dynamic mathematical model is constructed in the frequency domain using, for example, a suitable platform or application such as the MATLAB application. Moreover, the system identification approach offers a wide choice of dynamic models to best describe the thermal system by adjusting the number of poles and zeros of the linear time-invariant (LTI) transfer function.

In accordance with one exemplary calibration approach, the dynamic system is identified from the transient step-down thermal responses (the thermistor data and the infrared thermometer data) in the time domain. Thereafter, a discrete time system model is constructed and evaluated in the frequency domain to obtain a transfer function from the thermistor temperature to the infrared thermometer temperature. The identified dynamic model is then validated by comparing the predicted complete transient response (e.g., step-up, steady state, and step-down characteristics) with measurement data in the time domain. If valid, the validated dynamic model can then be used as a calibration curve to predict the real-time silicon junction temperature of the target transistor given any arbitrary transient input data from the thermistor. It should be appreciated that a similar approach could be used to obtain a calibration curve based on the step-up thermal responses.

Figure 5:
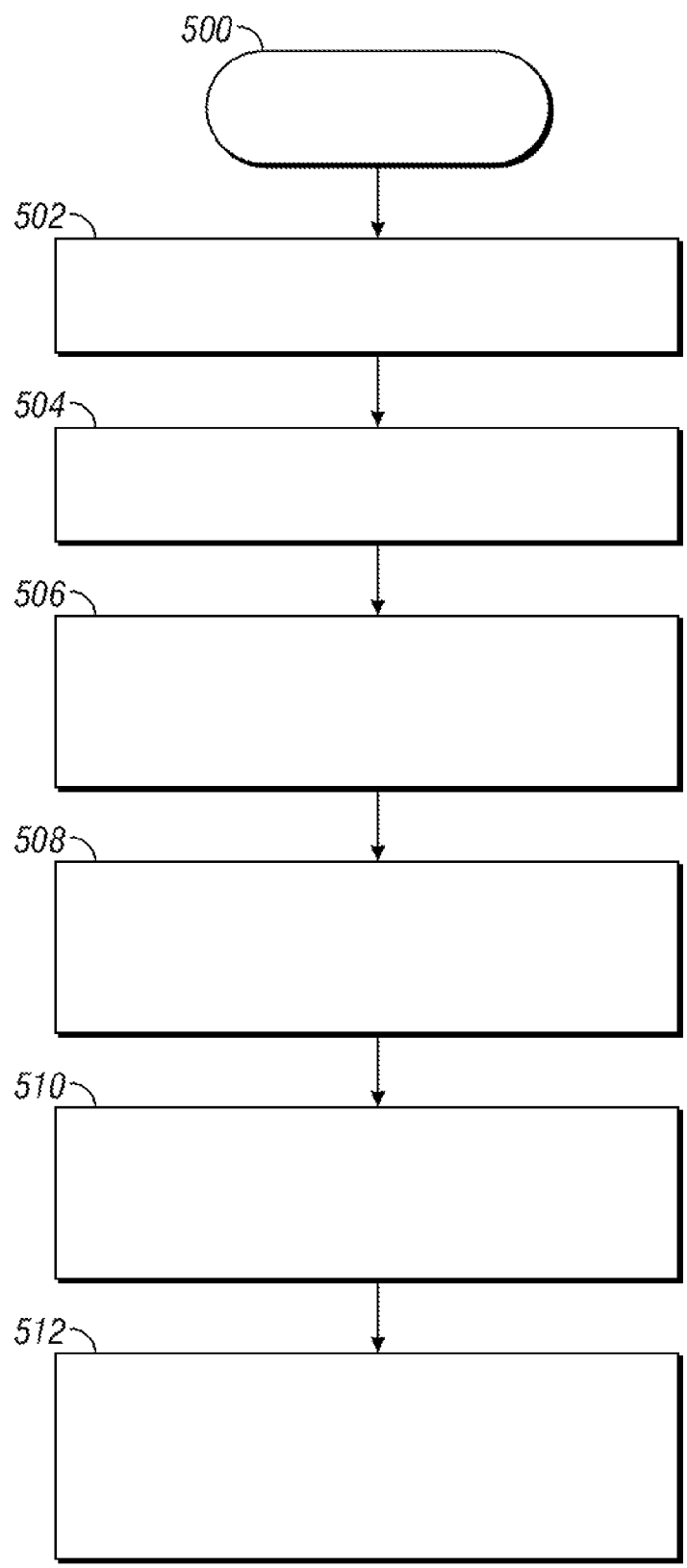
FIG. 5 is a flow chart that illustrates an exemplary embodiment of an operating process for a power inverter module of a vehicle.

The calibration curves can be stored and maintained in an onboard memory element for use in connection with a thermal protection scheme during vehicle operation. In this regard, FIG. 5 is a flow chart that illustrates an exemplary embodiment of an operating process 500 for a power inverter module of a vehicle. The various tasks performed in connection with process 500 may be performed by software, hardware, firmware, or any combination thereof. For illustrative purposes, the following description of process 500 may refer to elements mentioned above in connection with FIGS. 1-4. In practice, portions of process 500 may be performed by different elements of the described system, e.g., a processor, an inverter controller, or the like. It should be appreciated that process 500 may include any number of additional or alternative tasks, the tasks shown in FIG. 5 need not be performed in the illustrated order, and process 500 may be incorporated into a more comprehensive procedure or process having additional functionality not described in detail herein. Moreover, one or more of the tasks shown in FIG. 5 could be omitted from an embodiment of the process 500 as long as the intended overall functionality remains intact.

The illustrated embodiment of the process 500 begins by determining the current operating state of the host vehicle (task 502). In practice, there may be a limited and fixed number of predefined and detectable operating states, or an unlimited number of possible operating states contemplated by the process 500. The current operating state of the vehicle can be determined by monitoring any number of measurable quantities, parameters, status indicators, or the like. For example, the current operating state may be dictated by some or all of the following detectable items, without limitation: motor speed; motor current; switching frequency; modulation index; battery voltage; torque command; or motor temperature. The process 500 may then continue by selecting one of the plurality of stored calibration curves, profiles, or schemes for the current operating state (task 504). As mentioned previously, the system can store any number of calibration curves corresponding to any number of different designated operating states. Therefore, task 504 preferably selects the particular calibration curve that best "matches" the current operating state of the vehicle. In practice, the process 500 could exit or select a default calibration curve if the system determines that the current operating state has no associated calibration curve. This example assumes that task 504 selects one of the stored calibration curves for use in connection with the current operating state.

The process 500 obtains real-time temperature readings from the thermistor (task 506), which is remotely located away from the power transistor of interest. In practice, the thermistor readings can be obtained by measuring the electrical resistance of the thermistor and processing the resistance values in an appropriate manner to obtain corresponding temperature measurements. The thermistor readings can then be adjusted or calibrated as needed, using the selected calibration curve (task 508). In practice, application of the selected calibration curve results in an accurately predicted real-time silicon junction temperature for the transistor of interest, which is located in the power inverter module of the vehicle.

The process 500 analyzes the predicted real-time transistor temperature (task 510) in an appropriate manner to determine whether or not any action should be taken. In practice, the process 500 could evaluate and analyze temperature data at individual sample points, or it could consider a plurality of sample points concurrently for purposes of trend analysis. In either scenario, the process 500 may regulate or otherwise control the operation of the power inverter module in accordance with the predicted real-time silicon temperature (task 512) if needed. For example, the process 500 might initiate a thermal protection mode for the power inverter module when the predicted real-time transistor temperature exceeds a predetermined threshold temperature. As another example, the process 500 could adjust one or more performance or other operating characteristics or parameters of the power inverter module in response to the predicted real-time silicon temperature. In other words, the output of the inverter module can be influenced by the predicted real-time transistor temperature.

While at least one exemplary embodiment has been presented in the foregoing detailed description, it should be appreciated that a vast number of variations exist. For instance, although the embodiment described above relates to a power inverter application, the temperature prediction techniques and technology presented here could also be utilized in other applications, systems, and scenarios where accurate temperature prediction is desired.

It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of operating a power inverter module of a vehicle, the method comprising:
    obtaining a temperature reading at a location of the power inverter module that is remote from the power transistor;
    determining a current operating state of the vehicle;
    adjusting the temperature reading in accordance with a selected calibration curve corresponding to the current operating state of the vehicle, resulting in a predicted real-time silicon temperature for a transistor of the power inverter module; and
    operating the power inverter module in a manner that is influenced by the predicted real-time silicon temperature.

2. The method of claim 1, wherein obtaining the temperature reading comprises:
    measuring a temperature dependent characteristic of a sensor; and
    determining the temperature reading from the measured temperature dependent characteristic.

3. The method of claim 2, wherein measuring the temperature dependent characteristic comprises:
    measuring electrical resistance of a thermistor mounted on a circuit board of the power inverter module.

4. The method of claim 1, further comprising:
    maintaining a plurality of temperature calibration curves for a respective plurality of predetermined operating states of the vehicle;
    wherein the current operating state of the vehicle is one of the plurality of predetermined operating states of the vehicle; and
    wherein the selected calibration curve is one of the plurality of temperature calibration curves.

5. The method of claim 4, further comprising:
    deriving the plurality of temperature calibration curves; and
    storing the derived temperature calibration curves in a memory element.

6. The method of claim 5, wherein deriving the plurality of temperature calibration curves comprises:
    operating the power inverter module under conditions that emulate the plurality of predetermined operating states of the vehicle;
    collecting temperature readings at the location of the power module for a plurality of sampling points;
    measuring, with an infrared thermometer device, temperature of the power transistor for the plurality of sampling points; and
    correlating the collected temperature readings to the measured temperature of the power transistor for each of conditions that emulate the plurality of predetermined operating states of the vehicle.

7. The method of claim 1, wherein operating the power inverter module comprises initiating a thermal protection mode when the predicted real-time silicon temperature exceeds a threshold temperature.

8. The method of claim 1, wherein operating the power inverter module comprises adjusting performance characteristics of the power inverter module in response to the predicted real-time silicon temperature.

9. A method of operating a power inverter module of a vehicle, the power inverter module comprising a power transistor and a thermistor mounted at a location that is remote from the power transistor, the method comprising:
    obtaining a temperature reading using the thermistor;
    determining a current operating state of the vehicle;
    selecting, from a plurality of different temperature calibration curves, a selected calibration curve corresponding to the current operating state of the vehicle;
    adjusting the temperature reading with the selected calibration curve to obtain a predicted real-time temperature of the power transistor; and
    operating the power inverter module in accordance with the predicted real-time temperature of the power transistor.

10. The method of claim 9, wherein obtaining the temperature reading comprises:
    measuring electrical resistance of the thermistor; and
    determining the temperature reading from the measured electrical resistance.

11. The method of claim 9, further comprising:
    deriving the plurality of different temperature calibration curves; and
    storing the derived temperature calibration curves in a memory element.

12. The method of claim 11, wherein deriving the plurality of different temperature calibration curves comprises:
    obtaining a first step-up response of temperature versus time for the thermistor under a transient thermal condition;
    obtaining a second step-up response of temperature versus time for the power transistor under the transient thermal condition; and
    correlating the first step-up response to the second step-up response.

13. The method of claim 11, wherein deriving the plurality of different temperature calibration curves comprises:
    obtaining a first step-down response of temperature versus time for the thermistor under a transient thermal condition;
    obtaining a second step-down response of temperature versus time for the power transistor under the transient thermal condition; and
    correlating the first step-down response to the second step-down response.

14. The method of claim 9, wherein operating the power inverter module comprises initiating a thermal protection mode when the predicted real-time temperature exceeds a threshold temperature.

15. The method of claim 9, wherein operating the power inverter module comprises adjusting performance characteristics of the power inverter module in response to the predicted real-time temperature.

16. A power module system for a vehicle, the power module system comprising:
    a circuit board;
    a power transistor mounted to the circuit board;
    a temperature sensor mounted to the circuit board in a sensing location remote from the power transistor, the temperature sensor configured to measure a real-time temperature at the sensing location; and
    a processor coupled to the temperature sensor to generate a predicted real-time silicon temperature for the power transistor from the measured real-time temperature at the sensing location, wherein the predicted real-time silicon temperature is generated using a selected calibration curve that corresponds to a current operating state of the vehicle.

17. The power module system of claim 16, wherein the processor operates the power module system in accordance with the predicted real-time silicon temperature.

18. The power module system of claim 17, wherein the processor initiates a thermal protection mode for the power module system when the predicted real-time silicon temperature exceeds a threshold temperature.

19. The power module system of claim 17, wherein the processor adjusts performance characteristics of the power module system in response to the predicted real-time silicon temperature.

20. The power module system of claim 16, further comprising a memory element coupled to the processor and configured to store a plurality of temperature calibration curves for a respective plurality of predetermined operating states of the vehicle, wherein the selected calibration curve is one of the plurality of temperature calibration curves.

* * * * *